April 30, 1940. D. H. BLACK 2,199,278
ELECTRON DISCHARGE DEVICE
Filed Oct. 26, 1939
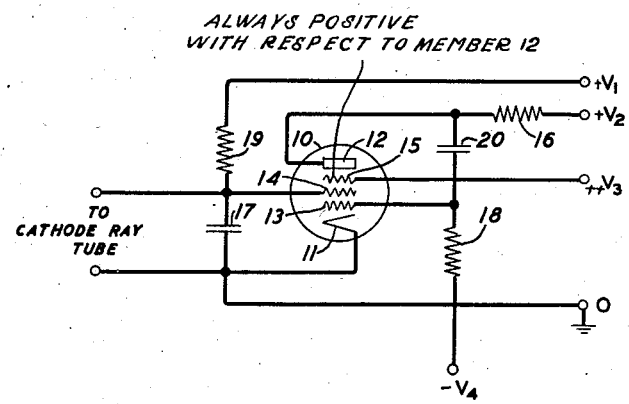
INVENTOR
D. H. BLACK
BY
*C. A. Sprague*
ATTORNEY Patented Apr. 30, 1940

2,199,278

UNITED STATES PATENT OFFICE 2,199,278

ELECTRON DISCHARGE DEVICE

Donald H. Black, London, England, assignor to Western Electric Company, Incorporated, New York, N. Y., a corporation of New York Application October 26, 1939, Serial No. 301,390
In Great Britain October 21, 1938

3 Claims. (Cl. 250—36)

This application relates to means for generating electric impulses and more specifically to generators of impulses of saw-tooth form suitable for causing deflection in cathode ray tubes.

In a copending application of D. H. Black, Serial No. 170,398 filed October 22, 1937, there is disclosed a circuit for the slow charging and the rapid discharge of a condenser in which arrangement use is made of the emission of secondary electrons from a positive electrode of a four-element high vacuum tube, both to assist in the discharge of the condenser and also to furnish a positive voltage on the grid of the tube to effect a rapid discharge. In this circuit the condenser, which is connected between the cathode and the grid nearer the plate, is charged through a resistance and discharged when the potential of this grid member is changed enough in the positive direction to allow the passage of current, the tube being biased to a non-conducting state by a negative potential applied to the first grid. Upon the start of the discharge, by means of a coupling condenser between the plate and the first grid, this grid is made more positive, thus accelerating the discharge. There are two paths for the discharge in this circuit, (1) the path of the primary electron stream from the cathode to the screen grid (the grid nearer the anode), and (2) the secondary electron stream from the anode to the screen grid. A disadvantage of the circuit in this copending application is that the positive electrode or plate of the tube is driven to a high potential because more secondaries are flowing from it to the second grid than there are primaries reaching it, and when the potential of the second grid falls during the discharge of the condenser, it tends to fall to a potential lower than that of the plate. As soon as the potential of the second grid becomes equal or nearly equal to the potential of the plate, the discharge action of the tube ceases. The result of this is that the condenser is never fully discharged and this fact tends to detract from the usefulness of the device.

In another copending application of D. H. Black, Serial No. 288,935, filed August 8, 1939, a method is disclosed for overcoming this difficulty wherein the positions of the tube and the condenser are inverted in the circuit, the second grid being connected directly to the positive line and the cathode of the tube receiving a varying potential. However, it is not always desirable that the cathode of the tube should receive the varying potential of the condenser.

It is an object of this invention to provide a novel generator of impulses suitable for cathode ray deflection which does not have the disadvantages mentioned above.

According to the present invention, an additional electrode is provided in the electron tube which, during operation of the circuit, remains always positive with respect to the plate or secondary emissive electrode and is thus capable of withdrawing the secondary electrons and of ensuring that the condenser is more completely discharged. The invention does not require that the cathode of the tube should receive the varying potential of the condenser. The circuit differs from that of the copending application Serial No. 170,398 by this change and by the changes made necessary by it.

The invention will be more readily understood by referring to the following description taken in connection with the accompanying drawing forming a part thereof in which the single figure is a circuit diagram of an arrangement embodying the invention.

Referring more specifically to the drawing, a relaxation oscillator circuit is shown comprising in the preferred embodiment thereof a single high vacuum tube 10 comprising a cathode 11, an anode or plate 12, a first or control grid 13, a second grid 14, and a third grid 15. The anode 12 is capable of emitting secondary electrons to such an extent that the number of secondaries is greater than the number of primaries. The greater the ratio of the number of secondaries to the number of primaries the more rapid will be the discharge time and therefore the anode surface is preferably treated in such a manner as to raise this ratio to a conveniently high value. For this purpose the anode may be formed or treated in any of the ways known in the construction of vacuum tubes, known as electron multipliers, and utilizing the secondary emission from an electrode bombarded by primary electrons. For example, the anode may comprise a coating of caesium oxide on a surface of silver.

The anode 12 has applied to it a steady positive potential $V_2$ through resistance 16. The voltage $V_2$ must be sufficient to cause more secondary electrons to be emitted than the number of primaries reaching the anode 12. The grid 15 is maintained at a relatively high positive potential $V_3$ through some source of relatively low impedance. The value of $V_3$ must be great enough to enable sufficient potential drop to be generated across the resistance 16 when electrons flow from the plate 12 to the grid 15 to give the grid 13 the necessary positive potential for the successful operation of the device. The second grid 14 of the tube and the cathode 11 are connected directly across the sweep condenser 17 and the first grid 13 of the tube is connected through a resistance 18 to a negative potential $V_4$. A voltage $V_1$ is applied to the condenser 17 through the resistance 19.

The operation of the circuit is as follows:

The condenser 17 becomes charged by the application of a voltage $V_1$ through the resistance 19. When the potential of the grid 14 is such as to overcome the negative potential on the grid 13 applied from source $V_4$ through the resistance 18, primary electrons will flow from the cathode 11 to the grid 14. Primary electrons will also flow to the electrode 15 and to the plate 12. The primary electrons reaching the plate 12 will give off an excess of secondary electrons which will be collected by the grid 15, thus causing a current to flow from the anode 12 through the resistance 16. This causes an increased positive potential to be applied to the electrode 13 through the condenser 20 resulting in an increase in the number of primary electrons, followed by a consequent increase in the number of secondary electrons from the anode 12, an increase in the current flowing in the resistance 16, and a further increase in the potential of the electrode 13. Thus, the discharge of the condenser by the primary electrons flowing from cathode 11 to the grid 14 becomes extremely rapid. The potential of the grid 14 can fall below the potential of the grid 15 and the plate 12 without causing the discharge of the condenser 17 to stop. Consequently, this condenser will discharge to much lower potentials than is the case in the circuit shown in the copending application, Serial No. 170,398.

When the condenser 17 has discharged to such an extent that the primary electron current begins to fall off, then the secondary electron current from the anode 12 to the grid 15 will also decrease. This will result in a negative pulse being transmitted to the control grid 13 with a consequent further reduction in primary current. This current-reducing process also becomes cumulative, resulting in a rapid resetting of the tube to the non-conducting state.

The relaxation or sweep voltage developed is taken off across the condenser 17. The magnitude of this oscillation depends upon the magnitude of the grid bias $V_4$ while the time taken for the condenser 17 to charge is proportional to the value of the resistance 19, the value of the condenser 17 and the magnitude of the voltage to be developed across the condenser 17. It is inversely proportional to the applied voltage $V_1$. The voltages $V_2$, $V_3$ and $V_4$, may be obtained in any convenient way as, for example, by means of a potentiometer device or the like.

It will be understood that the electrodes of the tube 10 may take other forms and dispositions than the simple successive grid and plate arrangement suggested in the foregoing and shown in the drawing, as it is to be understood that the invention is not limited to the embodiment above described, but extends to modifications based on the same underlying operating principle. Synchronizing impulses may be introduced into the control grid circuit in any known manner in order to initiate the discharge in accordance with usual practice when generating impulses of saw-tooth wave form. The condenser 17 may be charged through a saturated diode or through a pentode valve operating on the saturation portion of its characteristic in order to obtain a more uniform charging rate. The device may also be followed by amplifying and phase-inverting stages, if required, or otherwise used in accordance with known practice.

What is claimed is:

1. The combination with an electron discharge device having a cathode, a secondary emitting anode member and three control elements, of means for placing a negative bias on the first control element with respect to said cathode, a condenser, means for connecting said condenser between said cathode and the second control element, means for coupling said anode to said first control element, means for placing the third control element at a positive potential with respect to said anode at all times, and means for charging said condenser, said electron discharge device acting to periodically discharge said condenser, said third control element being so positioned with respect to said anode that it receives secondary electrons emitted therefrom.

2. In combination with an electron discharge device having a cathode, a secondary emitting electrode, and three control elements, of means for placing a negative bias on the first control element with respect to said cathode, a condenser, means for connecting said condenser between said cathode and the second control element, means including a condenser for coupling said anode to said first control element, means for placing the third control element at a positive potential with respect to said secondary emitting electrode at all times, and means for charging said condenser, said electron discharge device acting to periodically discharge said condenser, said third control element being so positioned with respect to said secondary emitting electrode that it receives secondary electrons emitted therefrom.

3. In combination with an electron discharge device having a cathode, a secondary emitting anode member, and three grid members located between said cathode and said anode member, means for placing a negative blocking potential on the first grid member with respect to said cathode, a condenser, means for connecting said condenser between said cathode and the second grid member, means for coupling said secondary emitting anode member to the first grid member, means including a resistance for applying a steady positive potential to said anode member with respect to said cathode which potential is sufficient to cause more secondary electrons to be emitted from said anode than the number of primary electrons reaching said anode from said cathode, low impedance means for placing the third grid member at a positive potential with respect to said anode member at all times whereby secondary electrons emitted from said anode member when primary electrons strike it are collected by said third grid member, and means including a source of potential and a resistance for charging the condenser between said cathode and said second grid member, said electron discharge device acting to discharge said condenser when the charge across said condenser becomes sufficiently high to raise the potential of the second grid member with respect to the cathode by an amount to cause the tube to become conducting, said third grid member serving to keep the discharge device conducting until and even though the condenser has discharged to a relatively low value.

DONALD H. BLACK.